United States Patent
Dobrozdravic et al.

(10) Patent No.: US 10,589,811 B2
(45) Date of Patent: Mar. 17, 2020

(54) DOOR HEM LENGTH MEASUREMENT TOOL

(71) Applicant: HONDA MOTOR CO., LTD., Tokyo (JP)

(72) Inventors: Todd Michael Dobrozdravic, Raymond, OH (US); Scott Henry Miazga, Columbus, OH (US); Nicholas James Pawlikowski, Raymond, OH (US)

(73) Assignee: HONDA MOTOR CO., LTD, Tokyo (JP)

( * ) Notice: Subject to any disclaimer, the term of this patent is extended or adjusted under 35 U.S.C. 154(b) by 170 days.

(21) Appl. No.: 15/933,120

(22) Filed: Mar. 22, 2018

(65) Prior Publication Data
US 2019/0291796 A1  Sep. 26, 2019

(51) Int. Cl.
*G01B 5/02* (2006.01)
*B62D 65/00* (2006.01)
*B60J 5/04* (2006.01)

(52) U.S. Cl.
CPC .......... *B62D 65/005* (2013.01); *G01B 5/02* (2013.01); *B60J 5/0415* (2013.01); *B60Y 2304/09* (2013.01)

(58) Field of Classification Search
CPC ...................................... G01B 5/02
USPC .................................. 33/194, 197
See application file for complete search history.

(56) References Cited

U.S. PATENT DOCUMENTS

| 5,551,162 A | * | 9/1996 | Struble | G01B 5/14 33/544.4 |
| 5,657,550 A | * | 8/1997 | Struble | G01B 5/14 33/544.4 |
| 5,775,036 A | * | 7/1998 | Stanley, Sr. | E04F 21/0015 248/354.4 |
| 6,973,739 B2 | | 12/2005 | Ewans | |

(Continued)

FOREIGN PATENT DOCUMENTS

CN   203587010 U   5/2014
DE   10 2010 046 206 B3   10/2011

(Continued)

OTHER PUBLICATIONS

"Brake Shoe Table Thickness Gauge", http://www.frasergauge.com/gauges/shoe%20Gauges/409%20Shoe%20Table%20Thickness%20Gauge. Accessed Mar. 22, 2018.

(Continued)

*Primary Examiner* — George B Bennett
(74) *Attorney, Agent, or Firm* — Arent Fox LLP (57) ABSTRACT

A device for measuring a flange in a creased sheet of metal is provided, along with a method of use thereof. The device includes a block including at least two slots and a body extending from the block in a first direction. The device also includes at least two retractable teeth. Each tooth is mounted in a respective one of the at least two slots. Each tooth is biased toward the first direction and retractable in a second direction opposite the first direction. A foot is mounted to an end of the body and includes a groove configured to receive an edge of the sheet of metal. A free edge of the flange is received in the groove and a creased edge is retained by the teeth. The flange may be measured by inserting a depth gauge through the block to a surface of the sheet of metal.

20 Claims, 10 Drawing Sheets

(56) References Cited

U.S. PATENT DOCUMENTS

| | | | |
|---|---|---|---|
| 7,040,151 B2 | 5/2006 | Graham et al. | |
| 7,240,436 B1* | 7/2007 | Miller | E04F 21/0015 |
| | | | 33/194 |
| 9,163,923 B2 | 10/2015 | McGuire et al. | |
| 9,285,203 B1 | 3/2016 | Mermoud et al. | |
| 2008/0115379 A1* | 5/2008 | Park | B60J 10/00 |
| | | | 33/613 |
| 2012/0124853 A1* | 5/2012 | Petersheim | G01B 5/14 |
| | | | 33/833 |
| 2015/0328692 A1* | 11/2015 | Beck | G01B 5/25 |
| | | | 33/645 |

FOREIGN PATENT DOCUMENTS

| | | |
|---|---|---|
| DE | 20 2013 007 460 U1 | 10/2013 |
| EP | 1671876 B1 | 7/2008 |
| EP | 2 610 579 A1 | 7/2013 |

OTHER PUBLICATIONS

"GearWrench Brake Lining Thickness Gauge" http://www.amazon.com/GearWrench-3962-Brake-Lining-Thickness/dp/B0015DMJ2S. Accessed Mar. 22, 2018.

"Go—No-Go Gauges" http://www.marposs.com/family.php/eng/go_no_go_thread_spline_gauges_flush_pins. Accessed Mar. 22, 2018.

* cited by examiner

DOOR HEM LENGTH MEASUREMENT TOOL

BACKGROUND

A vehicle door typically includes a structural member, a door skin, and a molding. The door skin is a finished sheet of metal that provides the outside surface of the door. Typically, an edge of the door skin is folded back on itself to form a flange. The molding is used to cover the flange and present an ornamental surface (e.g., chrome). Seals and wipers may also be attached to the molding to contact a door window.

During design and manufacture of a vehicle, the dimensions of the flange may need to be adjusted in order to properly contact and mount the molding. For example, the flange may be trimmed to ensure a proper fit of the molding. The inventors of the present application have discovered that a useful measurement of the flange is a dimension between a free edge of the flange and an exterior surface of the door skin. This measurement ensures, among other things, that the exterior surface of the door skin meets manufacturing specifications and proper fit of the molding. This dimension is difficult to measure because the door skin and the flange itself obstruct standard tools (e.g., calipers or micrometers).

In practice, the flange may be measured by using putty to make a mold of the flange. A cross-section of the mold may then be measured to determine the dimension between the free edge of the flange and the exterior surface of the door skin. This process may be time consuming due to the length of time it takes for the putty to harden. A "Go/No-Go" tool may also be used to verify that the dimensions of a flange are acceptable. Such tools, however, must be unique for each flange design and do not provide a measurement that can be used to make corrections because they only provide a correct/incorrect output.

In view of the foregoing, there is a need for a measurement device for measuring a flange formed by a crease in a sheet of metal. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

According to one aspect of the present disclosure, an apparatus for measuring a flange in a creased sheet of metal includes a block including at least two slots. A body extends from the block in a first direction. The apparatus includes at least two retractable teeth. Each tooth is mounted in a respective one of the at least two slots. Each tooth is biased toward the first direction and retractable in a second direction opposite the first direction. A foot is mounted to an end of the body and including a groove configured to receive an edge of the sheet of metal.

In another aspect, the disclosure provides a method of measuring a flange in a creased sheet of metal. The method may include inserting a free edge of the flange into a groove in a foot of a measuring device. The method may include retracting teeth of the measuring device into a block. The method may include inserting a creased edge of the flange into a space between the groove and the block. The method may include retaining the creased edge of the flange in the space with the teeth. The method may include measuring the flange with a depth gauge inserted through the block to contact the sheet of metal at a measurement point.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "vehicle," as used herein, refers to any moving vehicle that may be capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

Generally described, the present disclosure provides a tool for measuring a flange formed on a creased sheet of metal such as a door skin. The flange may, for example, provide for alignment with other parts such as a structural door member or decorative molding. Accurate measurement of the flange ensures that the metal part meets manufacturing specifications and that the metal part integrates with other parts.

The tool includes a block portion having retractable teeth, a body portion, and a foot portion. The tool clamps onto the flange with a free end of the flange engaged with a groove on the foot portion. The retractable teeth retain the flange against the body portion to prevent the tool from rotating about the flange. The block portion includes a through passage that allows for insertion and alignment of a depth gauge. The foot portion may be pivoted to allow zeroing the depth gauge with respect to the groove. Accordingly, the tool allows for a measurement of a distance from the free end of the flange to an external surface of the door skin. The tool may be used to measure similar flanges in other sheet metal parts such as body panels.

Figure 1:
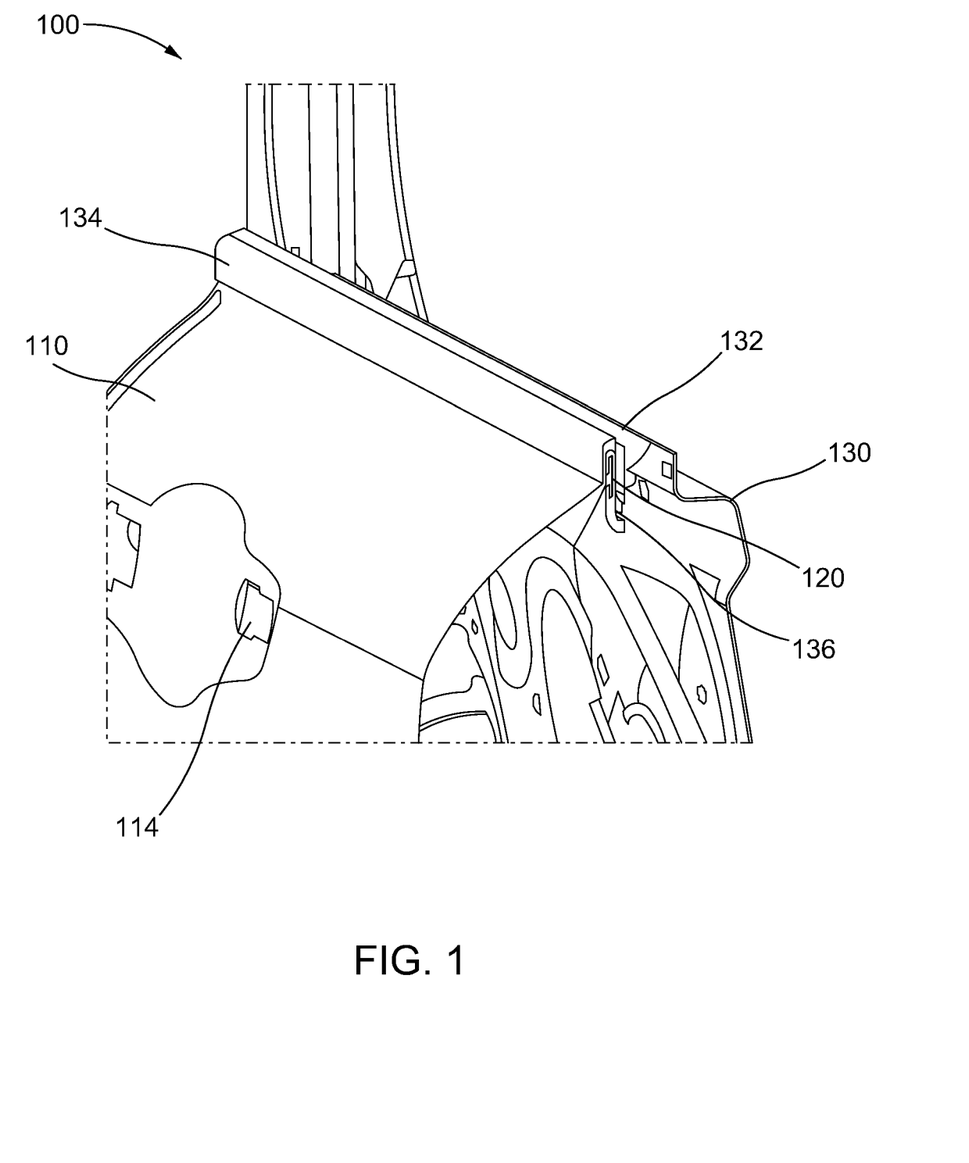
FIG. 1 is a perspective view showing example components of a vehicle door.

Turning to FIG. 1, a perspective view of a vehicle door 100 shows a door skin 110 and a structural member 130. The door skin 110 is a sheet of metal that forms an outer surface of the door. The door skin 110 may include openings 114 for a door handle. A window (not shown) may be mounted between the door skin 110 and the structural member 130. The door skin 110 may be formed, for example, by stamping a metal sheet into a desired shape. A top edge of the door skin 110 may include a flange 120. The flange 120 may be formed along the edge of the door skin 110 by bending and creasing an edge portion. A molding 134 may cover the flange 120 and include an ornamental surface. The molding 134 may also include a wiper 132 that contacts the window and a seal 140 that contacts an outer surface of the door skin 110. The molding 134 may be mounted to the flange via a molding clip 136. In the exemplary embodiment, the molding clip 136 includes a top portion 142 and a bottom portion 144.

Figure 2:
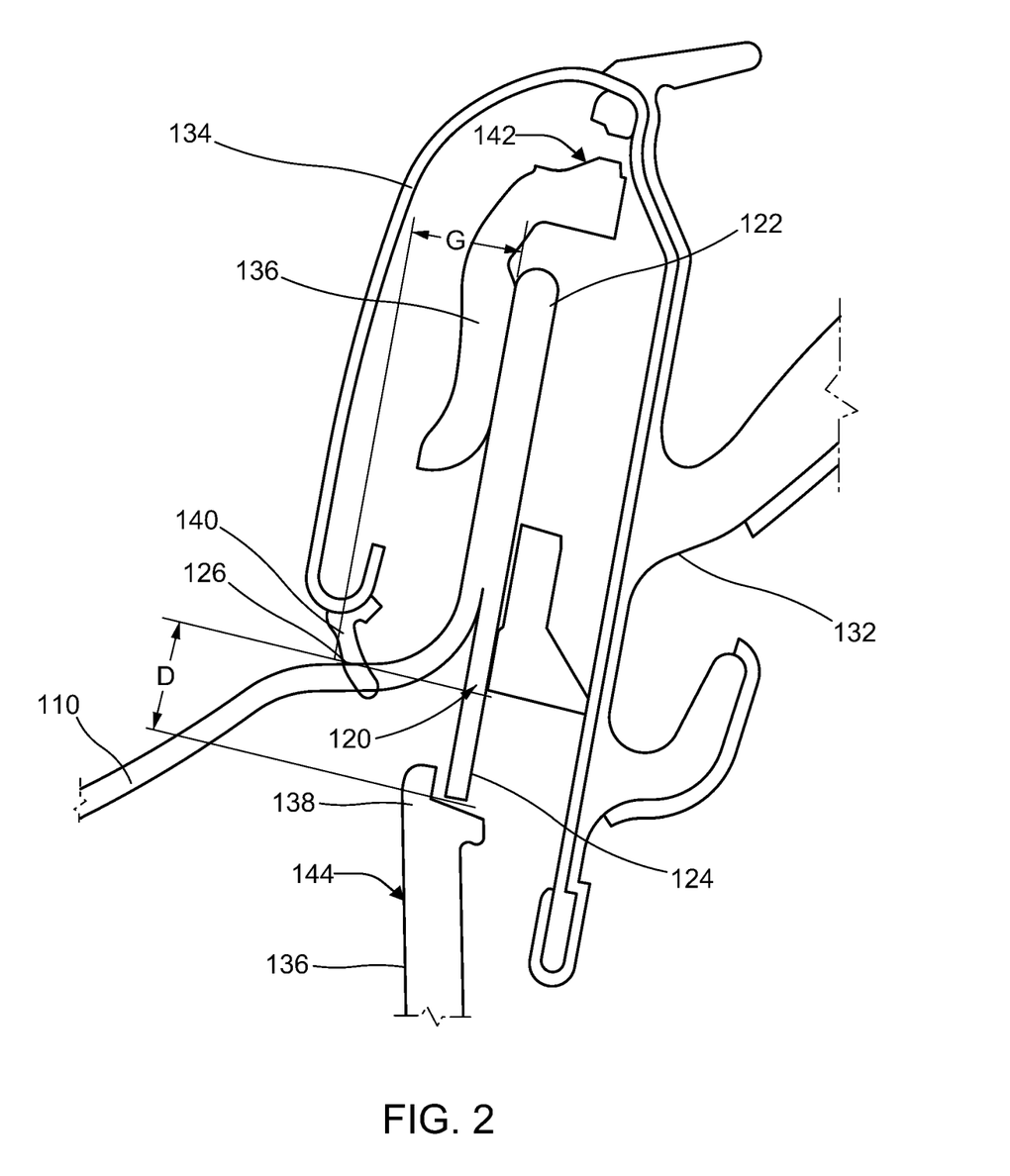
FIG. 2 is a cross-sectional view of a vehicle door showing an example door skin including a flange.

FIG. 2 illustrates a cross-sectional view of the door 100 near the flange 120. The flange 120 may be formed on the door skin 110 by bending the metal sheet back upon itself and forming a crease. Accordingly, the flange 120 may include a creased edge 122 (interchangeably referred to herein as a hemmed edge) where the metal sheet is creased. The creased edge 122 may attach to the top portion 142 of the molding clip 136. The flange 120 may also include a free edge 124 where the metal sheet ends. The free edge 124 may attach to the bottom portion 144 of the molding clip 136. The bottom portion 144 of the molding clip 136 may include a tooth 138 that retains the free edge 124. Additionally, the flange 120 may be oriented at an angle to an outer surface 126 of the door skin 110. The molding 134 may include a seal 140 that contacts the outer surface 126.

In order to properly retain the door skin 110 in relation to the molding clip 136, the flange 120 may have a critical dimension D between the free edge 124 and the outer surface 126. In an aspect, the critical dimension D may be measured at a distance G from the flange 120. In an aspect, the distance G may indicate the location of the seal 140. The distance G may be specified for a particular vehicle model based on the curvature of the door skin 110. If the dimension D is too small, the door skin may be inadvertently pulled over the tooth 138. If the dimension D is too large, the molding 134 may contact the outer surface 126 and the molding 134 may not seat properly. Accordingly, it is desirable to ensure that the dimension D is within manufacturing tolerances for a particular vehicle. It may also be possible to design or select a molding clip 136 based on a measurement of the flange 120. Accordingly, it may be desirable to have a precise and accurate measurement of the dimension D. As an example, door skins may have flanges with a flange length of between approximately 10 mm and 20 mm. The dimension D may be approximately 3 mm to 4 mm and may have a tolerance of approximately 0.5 mm. The distance G may be between approximately 2 mm and 10 mm It should be appreciated that door skins may be designed with different sized flanges and tolerances, but it may still be useful to obtain an accurate measurement of the flange 120 during manufacturing.

The present disclosure provides a tool and method for measuring the dimension D of a sheet of metal having a folded flange. Although the various exemplary embodiments may refer to a door skin, it should be appreciated that other vehicle components as well as other construction and manufacturing applications are conceived. For example, sheet metal with flanges may be used for other vehicle panels, building interior or exterior surfaces, fixtures, or appliances.

Figure 3:
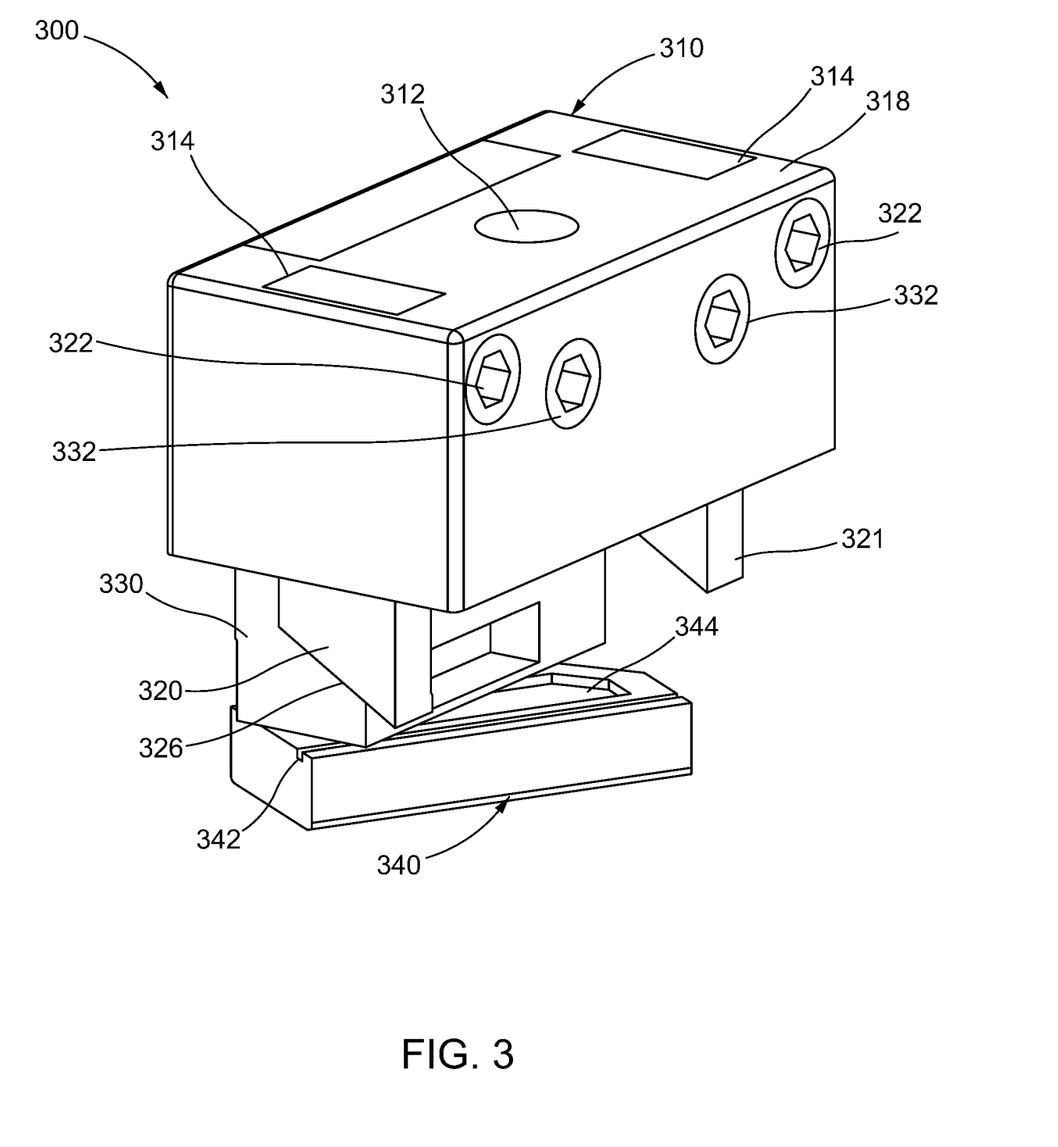
FIG. 3 illustrates a perspective view of an example measuring device according to an aspect of the disclosure.
Figure 4:
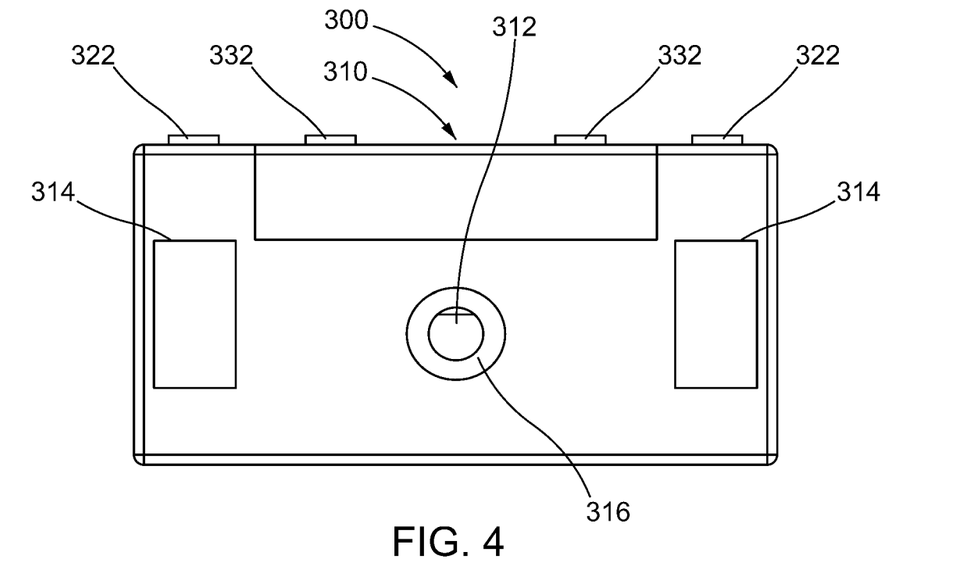
FIG. 4 illustrates a top view of the example measuring device in FIG. 3.
Figure 5:
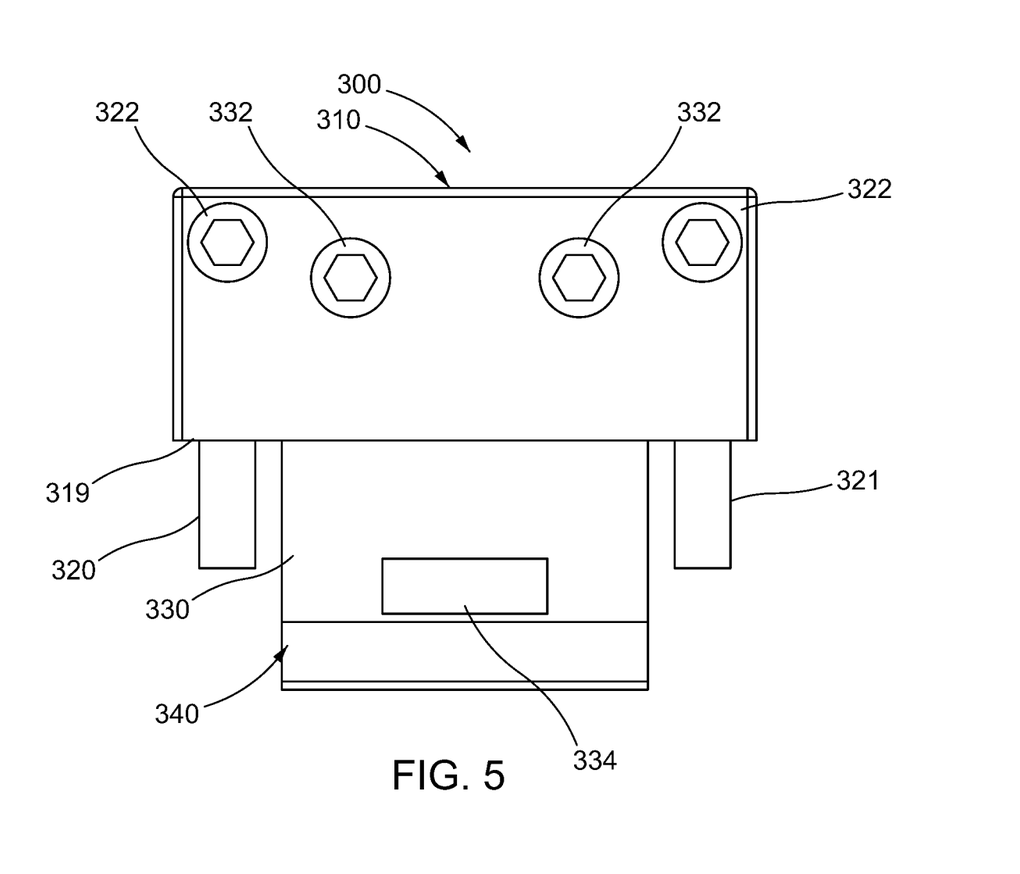
FIG. 5 illustrates back view of the example measuring device in FIG. 3.
Figure 6:
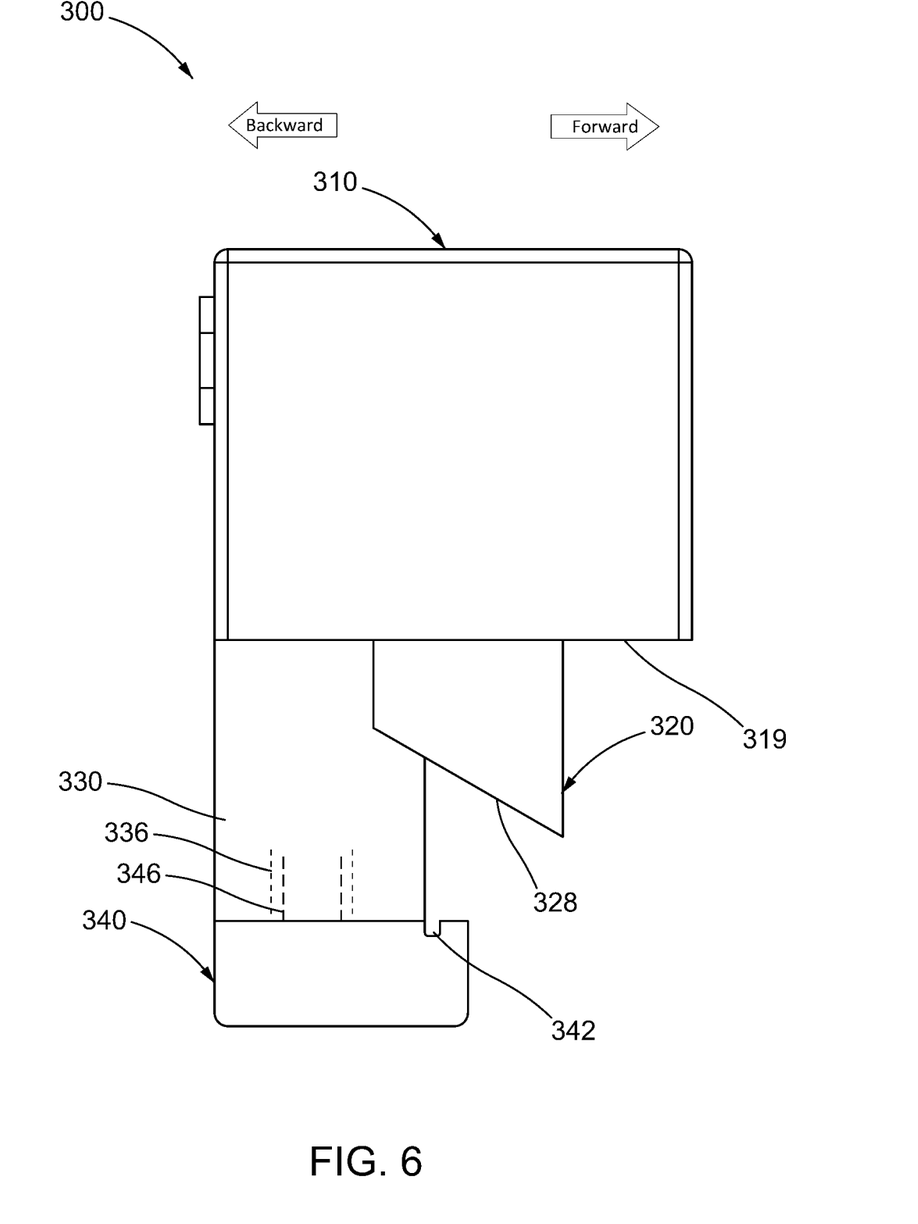
FIG. 6 illustrates a side view of the example measuring device in FIG. 3.
Figure 7:
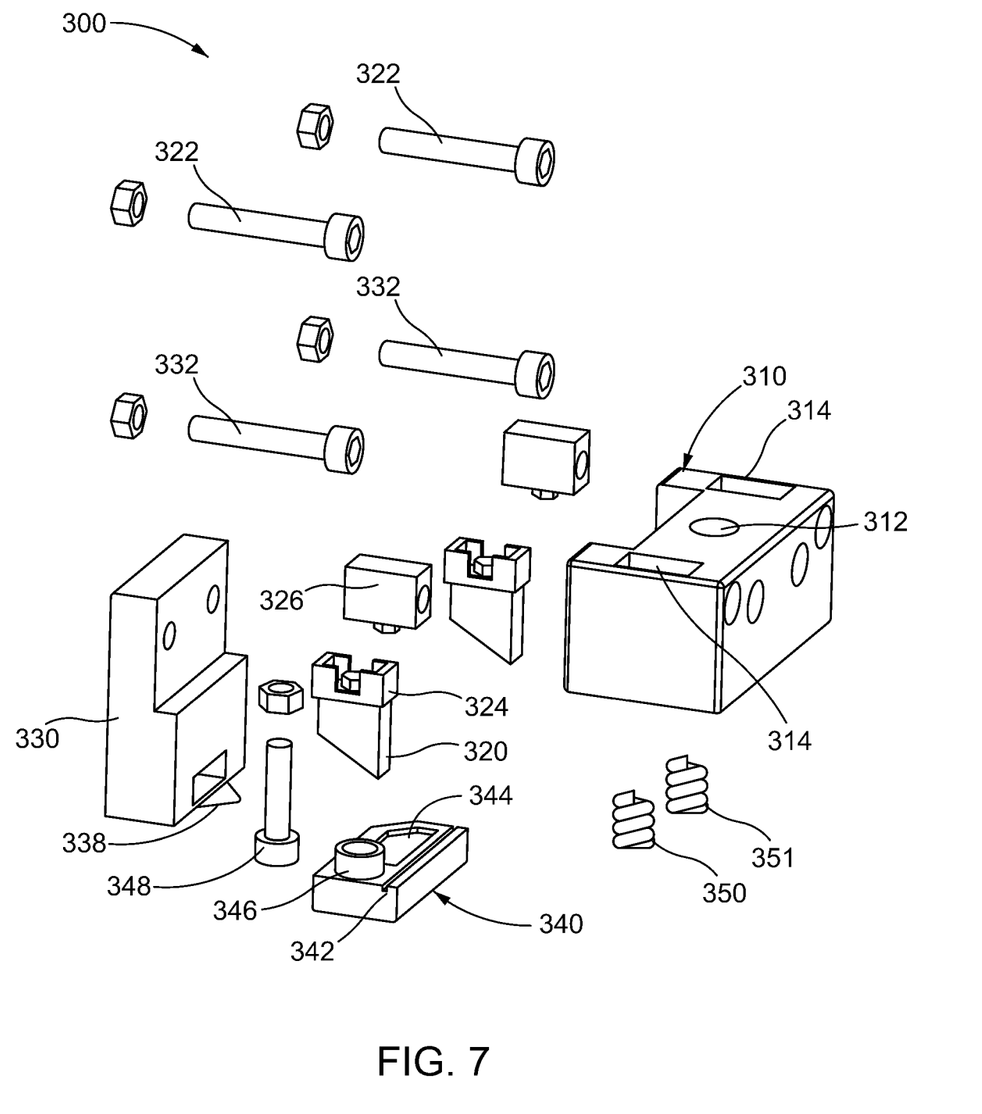
FIG. 7 illustrates an exploded view of the example measuring device in FIG. 3.

FIGS. 3-7 illustrate various views of an example of a measuring device 300. FIG. 3 is a perspective view showing the device 300 in a calibration position. FIG. 4 is a top view of the device 300. FIG. 5 is a back view of the device 300. FIG. 6 is a side view of the device 300. FIG. 7 is an exploded view of the device 300. The device 300 may include a block portion 310, retractable teeth 320 and 321, a body portion 330, and a foot portion 340. The retractable teeth 320, 321 and the body portion 330 may extend downward from the block portion 310 toward the foot portion 340. The foot portion 340 may be mounted to the body portion 330 and extend forward from the body portion 330. Generally, the flange 120 may be inserted into a space between the foot portion 340 and the block portion 310 against the body portion 330 for measuring the dimension D. The retractable teeth 320, 321 may retain the flange 120 against the body portion 330 to provide a consistent measurement.

The block portion 310 may be a rectangular prism, although other shapes are possible. The block portion 310 may include an passage 312 extending through the block portion 310 from a top surface 318 to a bottom surface 319. As best seen in FIG. 4, the passage 312 may include a shoulder 316. That is, the passage 312 may have a first diameter above the shoulder 316 and a second diameter below the shoulder 316. As described in further detail below, a depth gauge may be inserted through the passage 312. The shoulder 316 may serve as a stop for the depth gauge. The first diameter may be selected to accommodate a body of the depth gauge and align the depth gauge with the passage 312. The second diameter may allow a measurement rod of the depth gauge to pass through the passage 312. The block portion 310 may also include slots 314. For example, the block portion 310 may include at least two slots 314 located at opposite sides of the block portion 310. The slots 314 may house the retractable teeth 320 and 321, which may retract into the respective slot 314.

The retractable teeth 320, 321 may retain the flange 120 against the body portion 330. By using at least two retractable teeth 320, 321 that are spaced apart from each other, the measuring device 300 may be positioned on the flange 120 without tilting. The retractable teeth 320, 321 may be located in the slots 314 and may be retained by the fasteners 322, which may be, for example, threaded bolts. As best seen in FIG. 7, the retractable teeth 320, 321 may each include a fixed portion 326 and a movable portion 324. The fixed portion 326 may include an opening for receiving the fastener 322 to fix the fixed portion 326 within the slot 314. The fixed portion 326 may also include a projection for attaching a biasing device, for example, a spring 350 or 351. The movable portion 324 may include a similar projection for attaching the spring 350, 351. Accordingly, the movable portion 324 of the retractable teeth 320, 321 may be biased downward (e.g., by a respective spring 350, 351). In an aspect, the retractable teeth 320, 321 may each include an angled surface 328 that contacts the creased edge 122. The angled surface 328 may slope downward and away from the block portion 310 from back to front. Accordingly, the angled surface 328 may urge the creased edge 122 back toward the body portion 330 as the retractable teeth 320, 321 are biased downward.

The body portion 330 extends downward from the block portion 310. In an aspect, the body portion 330 is a separate component that is mounted to the block portion 310 via fasteners 332, which may be threaded bolts. In an aspect, the body portion 330 may be movable with respect to the block portion 310 in order to adjust the distance G where the measurement is made. For example, the fasteners 332 may be adjusted to move the body portion 330 with respect to the block portion 310 in a direction transverse to an axis of the passage 312. For example, the body portion 330 may move perpendicular to the axis of the passage 312. In another aspect, a shim may be inserted between the body portion 330 and the block portion 310 to obtain the desired distance G for the measurement. In another aspect, the body portion 330 may be integrally formed with the block portion 310 and the distance G may be fixed for the device 300. Additionally, the body portion 330 may include a magnet 334. The magnet 334 may help retain the device 300 on the flange 120.

The foot portion 340 may receive the free edge 124 of the flange 120 during a measurement process. The foot portion 340 may include a groove 342 extending the length of the foot portion 340. During a measurement, the free edge 124 may be placed in the groove 342 to align the door skin 110 with the passage 312. The groove 342 may be aligned with a surface of the body portion 330 such that the flange 120 rests flat against the surface of the body portion 330. The magnet 334 may help position the flange 120 within the groove 342 in case the groove 342 is wider than a thickness of the free edge 124. The foot portion 340 may also include a calibration surface 344. The calibration surface 344 may be a recessed area having the same depth as the groove 342. Accordingly, although a depth gauge may not fit within the groove 342, the calibration surface 344 may be used to calibrate (e.g., zero) the depth gauge to the bottom of the groove 342.

Figure 9:
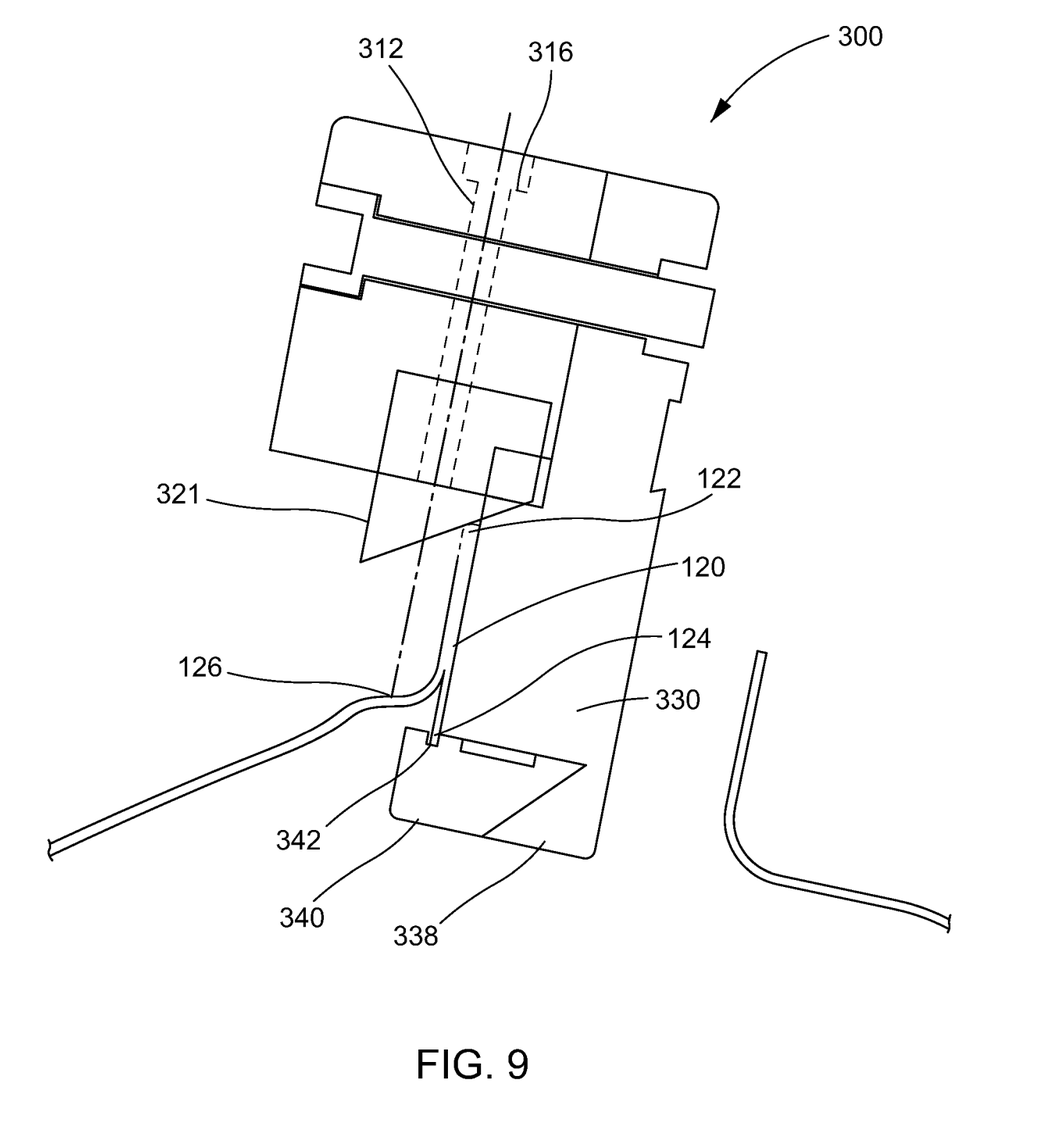
FIG. 9 illustrates a cross-section view of an example measuring device and example door skin according to an aspect of the disclosure.

In an aspect, the foot portion 340 may be pivotally mounted to the body portion 330. The foot portion 340 may include a washer 346 extending upward from the foot portion 340. The body portion 330 may include an opening 336 for receiving the washer 346 and/or a fastener 348 (e.g., a bolt) for pivotably mounting the foot portion 340 to the body portion 330. The foot portion 340 may pivot from a measurement position where the groove 342 is aligned with a surface of the body portion 330 to a calibration portion where the calibration surface 344 is aligned with the passage 312. The body portion 330 may also include a stop 338 extending downward from the body portion 330. As best seen in FIG. 9, the stop 338 may prevent pivoting the foot portion 340 past the measurement position. For example, the stop 338 may align the groove 342 with the surface of the body portion 330 when the foot portion 340 contacts the stop 338. The stop 338 may be angled to urge the foot portion 340 upward when the foot portion 340 is in the measurement position.

Figure 8:
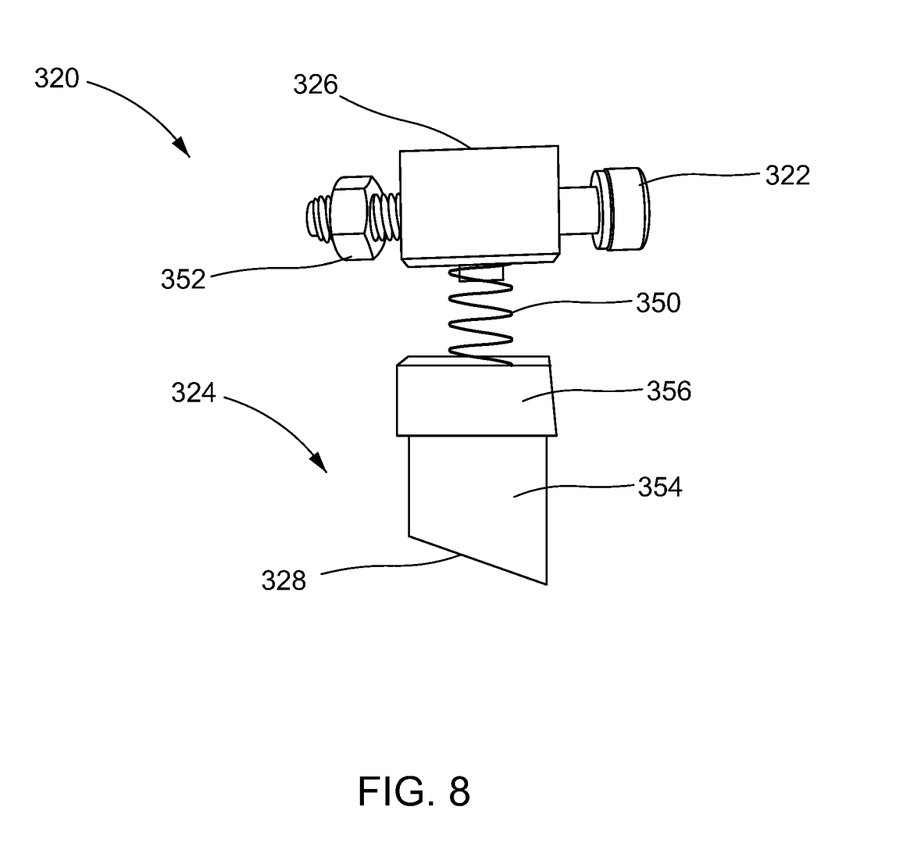
FIG. 8 illustrates a side view of an example retractable tooth according to an aspect of the disclosure.

FIG. 8 illustrates an example of an assembled retractable tooth 320 removed from the device 300. The retractable tooth 321 may be assembled in a similar manner as the retractable tooth 320. As discussed above, the retractable tooth 320 may include a movable portion 324, a fixed portion 326, and a spring 350. The fixed portion 326 may be fixed within the slots 314 by the fastener 322, which may be retained by the nut 352. The fixed portion 326 may have dimensions slightly smaller than the slot 314 to prevent movement within the slot 314. The spring 350 may be a coil spring, pneumatic cylinder, or other compressible resilient member. In an aspect, the spring 350 may couple the movable portion 324 to the fixed portion 326. The movable portion 324 may include a tooth portion 354 that extends from the slot 314 when the spring 350 is not compressed and an alignment portion 356 that generally remains within the slot 314. The alignment portion 356 may have dimensions slightly smaller than the slot 314 to allow sliding within the slot 314, but prevent rotation. Accordingly, the movable portion 324 may be retractably retained within the slot 314.

FIG. 9 is a cross-sectional view showing the device 300 in engagement with the flange 120. As illustrated, the foot portion 340 is in the measurement position. The flange 120 may rest flush against the body portion 330. The free edge 124 is positioned within the groove 342. The tooth 321 may urge the creased edge 122 against the body portion 330, and the tooth 321 may urge the creased edge 122 against the body portion 330 on an opposite side of the device 300. An axis of the passage 312 may be aligned with the outer surface 126. In an aspect, the passage 312 may be aligned with the outer surface 126 at the distance G from the flange 120. A depth gauge may be inserted through the passage 312 until the body of the depth gauge contacts the shoulder 316. Accordingly, the depth gauge may be used to measure the dimension D between the outer surface 126 and the free edge 124.

Figure 10:
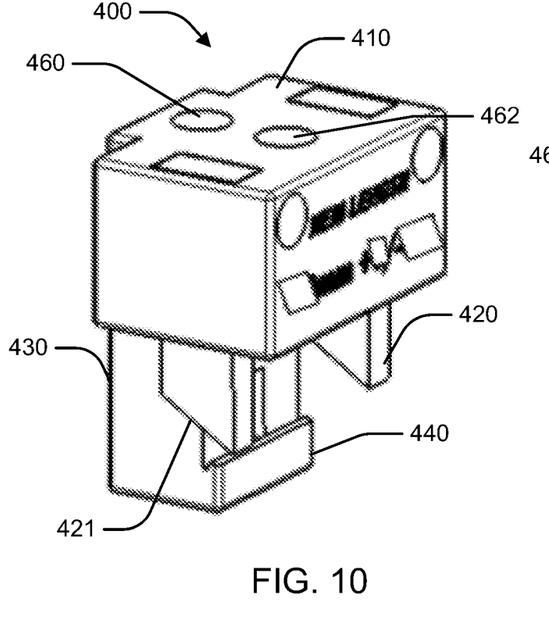
FIG. 10 illustrates a perspective view of an example measuring device according to an aspect of the disclosure.
Figure 11:
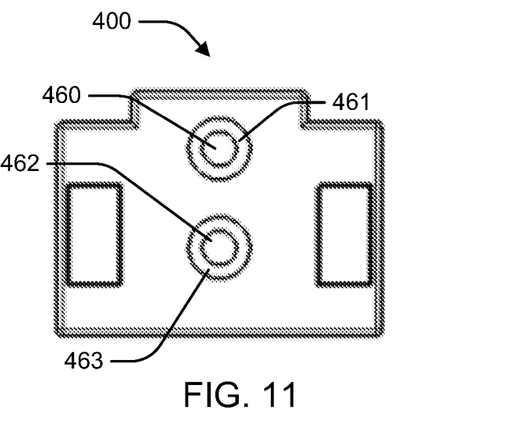
FIG. 11 illustrates a top view of the example measuring device in FIG. 10.
Figures 12, 13:
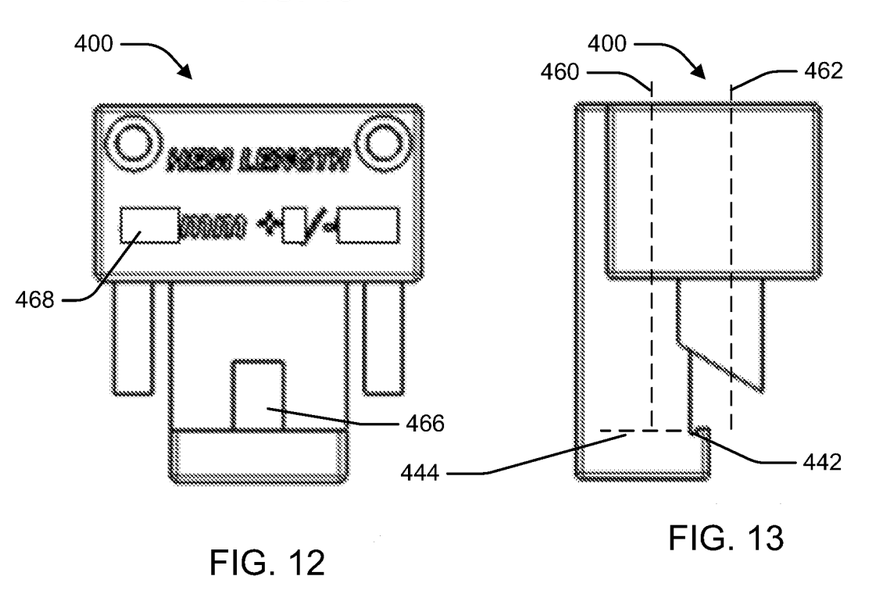
FIG. 12 illustrates back view of the example measuring device in FIG. 10.
FIG. 13 illustrates a side view of the example measuring device in FIG. 10.

FIGS. 10-13 illustrate various views of another example of a measuring device 400. FIG. 10 is a perspective view showing the device 400. FIG. 11 is a top view of the device 400. FIG. 12 is a back view of the device 400. FIG. 13 is a side view of the device 400. The device 400 may include the same general components as the device 300. For example, the device 400 include a block portion 410, retractable teeth 420 and 421, a body portion 430, and a foot portion 440 that are similar to the corresponding components of the measuring device 300. In an aspect, the block portion 410, body portion 430, and foot portion 440 of the device 400 may be integrally formed (e.g., via additive manufacturing or molding). The retractable teeth 420, 421 may be constructed and operated in the same manner as retractable teeth 320, 321.

The device 400 may include a first passage 460 and a second passage 462 through the block portion 410. Each passage 460, 462 may include a corresponding shoulder 461, 463 located at the same depth for contacting a depth gauge. The first passage 460 may also extend through the body portion 430 to a calibration surface 444. The calibration surface 444 may be at the same depth as the groove 442. The calibration surface 444 may be viewed through a window 466 in the body portion 430. The first passage 460 may be used to calibrate a depth gauge by zeroing the depth gauge to the depth of the groove 442. The depth gauge may be viewed through the window 466 to ensure contact with the calibration surface 444. The second passage 462 may aligned with the outer surface 126 of the door skin 110 at the distance G from the flange 120. A depth gauge may be inserted through the second passage 462 until the body of the depth gauge contacts the shoulder 463 and the tip of the depth gauge contacts the outer surface 126. Accordingly, the depth gauge may be used with device 400 to measure the dimension D between the outer surface 126 and the free edge 124. In an aspect, the measurement device 400 may include markings 468 indicating a correct measurement and tolerance for the dimension D.

Figure 14:
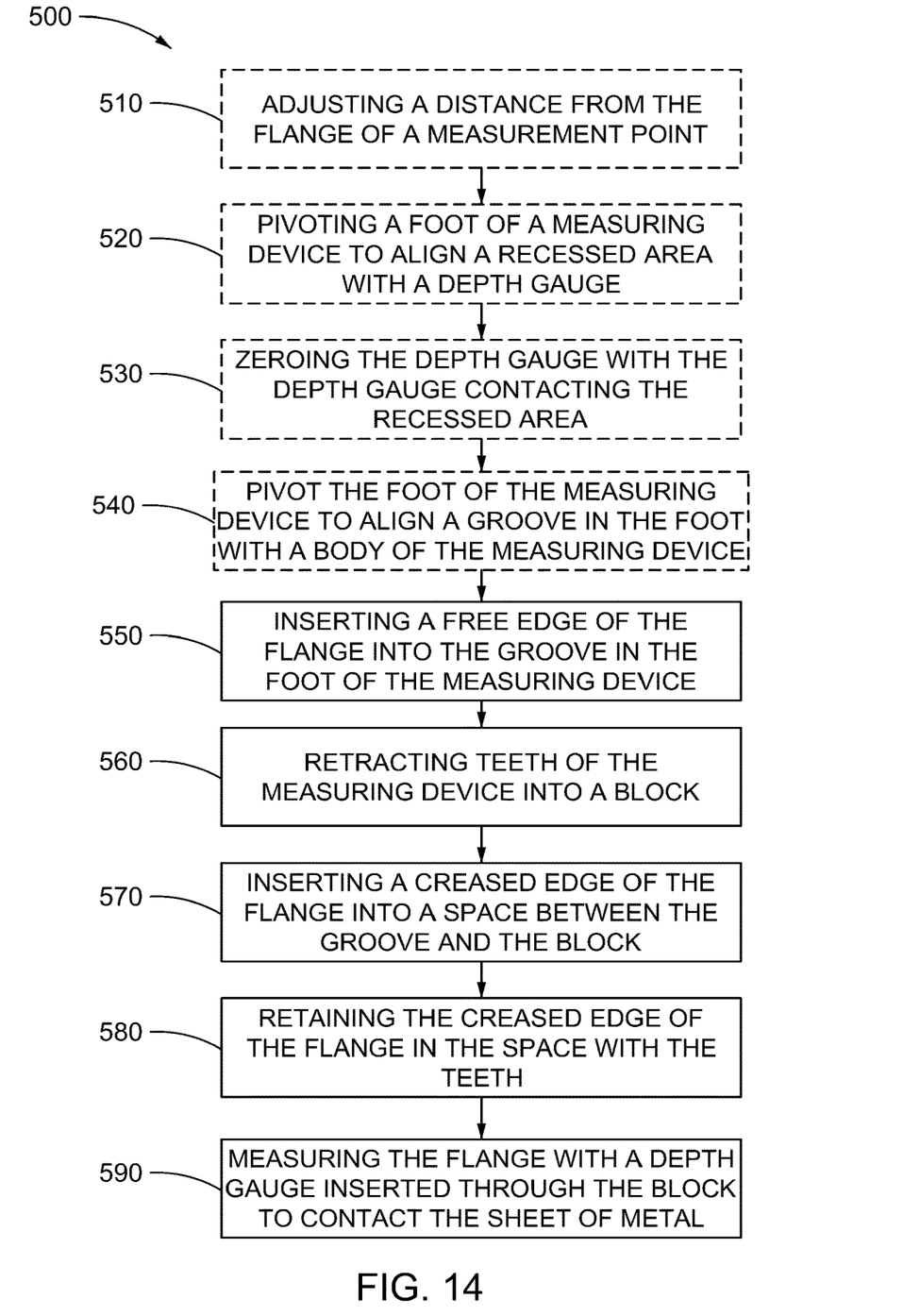
FIG. 14 illustrates a flowchart showing an example method of measuring a flange formed in a sheet of metal according to an aspect of the disclosure.

FIG. 14 illustrates a flowchart showing an example of a method 500 for measuring a flange in a sheet of creased metal according to an aspect of the disclosure. The method 500 may be performed using the measuring device 300 or the measuring device 400. For example, the method 500 may be used to measure the flange 120 of the door skin 110 using the measuring device 300 or the measuring device 400. Optional blocks are shown with dashed lines.

In block 510, the method 500 may optionally include adjusting a distance from the flange of a measurement point. In an aspect, for example, the user may adjust the distance G from the flange 120 to the measurement point on the outer surface 126. For example, the distance G may be based on a designed or specified distance for a part. The measurement point may be adjusted on the measuring device 300 by adjusting (e.g., loosening or tightening the fasteners 332. A shim may also be inserted between the block portion 310 and the body portion 330 to adjust the distance G.

In block 520, the method 500 may optionally include pivoting a foot of a measuring device to align a recessed area with a depth gauge. In an aspect, for example, a user may pivot the foot portion 340 of the device 300 to align the calibration surface 344 with a depth gauge. For example, the depth gauge may be inserted into the passage 312 and aligned with the axis of the passage 312. The foot portion 340 may be pivoted to the calibration position. The foot portion 340 may be pivoted approximately 90 degrees such that the foot portion 340 extends transverse to the body portion 330 and the calibration surface 344 is aligned with the axis of the passage 312.

In block 530, the method 500 may optionally include zeroing the depth gauge with the depth gauge contacting the recessed area. In an aspect, for example, the user may zero the depth gauge while the depth gauge contacts the calibration surface 344 or the calibration surface 444. Using the measuring device 300, the user may insert the depth gauge though the passage 312 while the foot portion 340 is pivoted to the calibration position. Using the measuring device 300, the user may insert the depth gauge through the first passage 360 to the calibration surface 344. The user may zero the depth gauge, for example, on a digital depth gauge, by pressing a button. For an analog depth gauge, the user may take a reading. The calibration surface 344, 444 may have the same depth as the groove 342, 442. Accordingly, zeroing the depth gauge based on the calibration surface 344, 444 may set the depth to the depth of the groove 342.

In block 540, the method 500 may optionally include pivoting the foot to align a groove in the foot with a body of the measuring device. In an aspect, for example, the user may pivot the foot portion 340 to align the groove 342 with the body portion 330 of the measuring device 300. The groove 342 may be aligned when parallel to a surface of the body portion 330. The foot portion 340 may be pivoted to the measurement position.

In block 550, the method 500 may include inserting a free edge of the flange into a groove in the foot of the measuring device. In an aspect, for example, the user may insert the free edge 124 into the groove 342, 442 in the foot portion 340, 440 of the measuring device 300, 400. In an aspect, the groove 342, 443 may be sized to receive the free edge 124. In another aspect, the groove 342 may be wider than the thickness of the free edge 124. The magnet 334 may pull the flange 120 against the body such that the free edge 124 contacts an edge of the groove 342 adjacent the body portion 330.

In block 560, the method 500 may include retracting teeth of the measuring device into a block. In an aspect, for example, the user may retract the teeth 320, 321 of the measuring device 300 into the block portion 310. For example, the teeth 320, 321 may be retracted into the slots 314 of the block portion 310. The teeth 320, 321 may be retracted by pressing the flange 120 against the teeth 320, 321. The teeth 420, 421 may be retracted in a similar manner.

In block 570, the method 500 may include inserting a creased edge of the flange into a space between the slot and the block. In an aspect, for example, the user may insert the creased edge 122 of the flange 120 into the space between the groove 342, 442 and the block portion 310, 410.

In block 580, the method 500 may include retaining the creased edge of the flange in the space with the teeth. In an aspect, for example. The user may retain the creased edge 122 of the flange 120 in the space with the teeth 320, 321. For example, the teeth 320, 321 may be biased downward toward the flange 120. As the user pushes the creased edge 122 past the teeth 320, 321, the teeth 320, 321 may move downward to contact the creased edge 122. The angled surfaces 328 may contact the creased edge 122 and urge the flange 120 toward the body portion 330. The teeth 420, 421 may retain the creased edge of the flange 120 in a similar manner.

In block 590, the method 500 may include measuring the flange with a depth gauge inserted through the block to contact the sheet of metal. In an aspect, for example, the user may measure the flange 120 with a depth gauge inserted through the passage 312 in the block portion 310 to contact the door skin 110. When using the measuring device 400, the user may measure the flange 12 with a depth gauge inserted through the second passage 362 in the block portion 410 to contact the door skin 110. In an aspect, the measurement of the flange 120 may be the dimension D from the free edge 124 of the flange 120 to the outer surface 126. Since the depth gauge is zeroed in block 530 to the bottom to the bottom of the groove 342, 442, which contacts the free edge 124, the measurement of a zeroed digital depth gauge when the depth gauge contacts the door skin 110 will be the dimension D in FIG. 2 between the free edge 124 and the outer surface 126 of the door skin 110. In the case of a mechanical depth gauge the dimension D may be found by subtracting the reading when the depth gauge is in contact with the door skin from the reading when the depth gauge is in contact with the calibration surface 344, 444.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. An apparatus for measuring a flange in a creased sheet of metal comprising:
   a first block including at least two slots;
   a body extending from the first block in a first direction;
   at least two retractable teeth, each tooth mounted in a respective one of the at least two slots, each tooth biased toward the first direction and retractable in a second direction opposite the first direction; and a foot mounted to an end of the body and including a groove configured to receive an edge of the sheet of metal.

2. The apparatus of claim 1, wherein the first block includes a first through passage extending in the first direction between the at least two slots.

3. The apparatus of claim 2, further comprising a depth gauge insertable through the first through passage.

4. The apparatus of claim 2, wherein the first through passage is aligned with a calibration surface having a same depth as the groove, the apparatus further comprising a second through passage extending in the first direction and aligned with a surface of the sheet of metal.

5. The apparatus of claim 1, wherein the foot is pivotably mounted to the end of the body and includes a recessed portion having a same depth as the groove.

6. The apparatus of claim 1, wherein the at least two retractable teeth urge a creased edge of the sheet of metal against the body.

7. The apparatus of claim 1, wherein the at least two retractable teeth are configured to contact the creased edge at a variable distance from the block.

8. The apparatus of claim 1, wherein the at least two retractable teeth have respective surfaces angled toward the body in the second direction.

9. The apparatus of claim 1, wherein the body portion is movable with respect to the block portion in a direction transverse to the first direction.

10. The apparatus of claim 1, wherein the sheet of metal is a door skin for a vehicle.

11. The apparatus of claim 1, wherein the body portion includes a magnet.

12. A method of measuring a flange in a creased sheet of metal, comprising:
    inserting a free edge of the flange into a groove in a foot of a measuring device;
    retracting teeth of the measuring device into a block;
    inserting a creased edge of the flange into a space between the groove and the block;
    retaining the creased edge of the flange in the space with the teeth; and
    measuring the flange with a depth gauge inserted through the block to contact the sheet of metal at a measurement point.

13. The method of claim 12, further comprising pivoting the foot to align a recessed area with the depth gauge, wherein the recessed area has a same depth as the groove.

14. The method of claim 13, further comprising zeroing the depth gauge with the depth gauge contacting the recessed area.

15. The method of claim 14, further comprising pivoting the foot of the measuring device to align a groove in the foot with a body of the measuring device.

16. The method of claim 12, further comprising adjusting a distance from the flange to the measurement point.

17. The method of claim 12, wherein the teeth urge the creased edge against a body extending between the block and the foot.

18. The method of claim 12, further comprising inserting the depth gauge through a first passage in the block to contact a recessed area with the depth gauge, wherein the recessed area has a same depth as the groove, wherein measuring the flange with the depth gauge comprises inserting the depth gauge through a second passage in the block.

19. The method of claim 12, wherein the teeth are configured to contact the creased edge at a variable distance from the block.

20. The method of claim 12, wherein the sheet of metal is a door skin for a vehicle.

* * * * *